United States Patent [19]
Amro et al.

[11] Patent Number: 5,950,216
[45] Date of Patent: Sep. 7, 1999

[54] METHOD AND SYSTEM FOR MARKING AND SUBSEQUENTLY RETRIEVING A COLLECTION OF OBJECTS WITHIN A MULTIPAGE COMPOUND DOCUMENT UTILIZING SELECTABLE PAGE NUMBERED DIALOG BOXES

[75] Inventors: Hatim Y. Amro, Austin; Dan L. Dao, Cedar Park; John P. Dodson, Pflugerville, all of Tex.

[73] Assignee: International Business Machines Corporation, Armonk, N.Y.

[21] Appl. No.: 08/748,221

[22] Filed: Nov. 12, 1996

[51] Int. Cl.⁶ .................................................. G06F 15/163
[52] U.S. Cl. ............................................................ 707/515
[58] Field of Search ................................... 345/341, 973, 345/974, 342, 347; 707/515

[56] References Cited

U.S. PATENT DOCUMENTS

| | | | |
|---|---|---|---|
| 5,283,864 | 2/1994 | Knowlton | 395/158 |
| 5,339,391 | 8/1994 | Wroblewski et al. | 395/157 |
| 5,479,600 | 12/1995 | Wroblewski et al. | 395/157 |
| 5,506,951 | 4/1996 | Ishikawa | 395/157 |

*Primary Examiner*—Mark R. Powell
*Assistant Examiner*—Alford W. Kindred
*Attorney, Agent, or Firm*—Richard A. Henkler; Andrew J. Dillon

[57] ABSTRACT

A method and system for marking and subsequently retrieving a collection of objects contained within a compound document. The compound document is displayed within a graphical user interface within a data processing system. The graphical user interface includes a scroll bar. A collection of objects within a portion of the compound document may be selected by a user. Thereafter, a horizontal line is displayed within the scroll bar which corresponds to the relative location of the collection of objects within the compound document. Next, in response to a user input, a dialog box is displayed at a location adjacent the horizontal line. The graphical user interface next prompts a user to enter within the dialog box a label and attributes of the collection of objects. Thereafter, In response to a selection of the horizontal line, the dialog box, including the label and the attributes, is displayed; and in response to a subsequent user input, the compound document is automatically scrolled to a location which corresponds to the location of the collection of objects within the compound document.

12 Claims, 7 Drawing Sheets

OBJECT CONTAINER EXPANSION

METHOD AND SYSTEM FOR MARKING AND SUBSEQUENTLY RETRIEVING A COLLECTION OF OBJECTS WITHIN A MULTIPAGE COMPOUND DOCUMENT UTILIZING SELECTABLE PAGE NUMBERED DIALOG BOXES

The present invention is related to co-pending applications, Ser. No. 08/748,218, and Ser. No. 08/771,349, both assigned to the assignee herein named and filed of even date herewith.

BACKGROUND OF THE INVENTION

1. Technical Field

The invention relates in general to data processing systems and in particular to computer systems and computer displays that include data display regions which display a portion of a stored date file such as a compound document. In particular, the invention relates to a graphical user interface for marking and subsequently retrieving a collection of objects within a compound document. More particularly, the invention relates to a graphical user interface for maintaining a consistent collection of objects within a compound document.

2. Description of the Related Art

A graphical user interface is a type of display format that enables a user to choose commands, start programs, and see lists of files and other options by pointing to pictorial representations (icons) and lists of menu items on the screen. Choices can generally be activated by either a keyboard or a mouse.

For application developers, graphical user interfaces offer an environment that handles direct interaction with the computer. Such an environment frees the developer to concentrate on a given application without becoming entangled in the details of a screen display or mouse and keyboard input. It also enables programmers to create programs to handle frequently performed tasks, such as saving a data file. The interface itself provides standard controlling mechanisms such as windows and dialog boxes. Another benefit is that applications written for graphical user interfaces are device independent: as the interface changes to support new input and output devices, such as a large screen monitor or an optical storage device, the applications can, without modification, use those devices.

Some conventional graphical user interface methods provide a scroll bar for scrolling through pages of a document. Scrolling permits viewing of any desired portion of a document and is so named because it is the electronic equivalent of reading through a rolled (scrolled) document rather than flipping through pages of a book. A computer keyboard provides a number of "scroll-control" keys, such as the up, down, left, and right arrow keys. Application programs often offer additional methods of scrolling—for example, combing the "control" and "page up" keys to move to the beginning of a document.

Scroll bars typically are utilized in graphical user interfaces to accomplish a scrolling task. A vertical or horizontal bar at the side or bottom of a window that can be used with a mouse for moving around in a document can be utilized in a typical scrolling task. For example, software word processing programs commercially available typically utilize two scroll bars for scrolling through pages of a document. Typically, a vertical scroll bar is used to control movement or to scroll through lines and pages of a document. A horizontal scroll bar controls movement through words in a line.

Conventional graphical user interfaces which scroll bars usually include two arrows and a slider. Each arrow controls the direction in which a user desires to scroll through a document. An arrow conventionally controls movement through a document in small increments or small blocks of information, such as individual lines or a page of a document, for example. Moreover, if an arrow points in the upward direction, the document will be scrolled from its present position in the document toward the first page. If an arrow points in the downward position, the document will be scrolled from its present position in a document toward the last page of the document.

A slider is conventionally used to control movement through a document in larger increments than when the arrows are used. Instead of incrementing by small blocks of information, the slider typically controls movement through a document in larger blocks, increments or groups of information, such as two or more pages, for example. Therefore, when a user desires to move from the first page to the fiftieth page, the slider is usually selected and moved until page fifty is selected. The term "elevator" is also utilized to describe such a slider.

A document having multiple objects capable of running within the document such as spreadsheets, text, hotlinks, pictures, sounds, and video objects is a compound document. With such a compound document are collections of objects. An example of a collection of objects is a "page" as in a word processing document. When adding objects to the collection of objects, the collection of objects often merges with an adjacent collection of objects, interrupting uniformity in the compound document and the collection of objects. For example, if too much text or graphics are added to a page in a word processing document, objects at the "bottom" of the page are pushed into the next page, upsetting the uniformity in the collection of objects and the compound document. A collection of objects which maintains uniformity in a compound document is a goal sought by designers of graphical user interface environments. Such a collection of objects can be referred to as an object container.

In conventional graphical user interface environments, a typical window displays a portion (e.g. an object container) of a compound document. The size and position of the elevator within a window scroll bar corresponds to the size and position of the current viewable object container in relation to the compound document. Because the compound document includes too many object containers or pages to view simultaneously, the user can position a mouse cursor over an arrow section of the window scroll bar and click a pointing device (e.g. a mouse) to scroll the document upward or downward, as appropriate.

Some object containers in a compound document do not have text associated with them, and in turn cannot normally be searched. In practice, such object containers are typically located with a "hit and miss" strategy. The user guesses where such object containers reside in the compound document. However, the user is forced to sequentially search the actual pages of the compound document for the specific object container, a time consuming and often error prone task.

It is thus desirable to have a reliable and efficient technique to retrieve object containers from a compound document. It also desirable to maintain uniformity in the compound document and its associated object containers when adding or deleting objects from an object container.

SUMMARY OF THE INVENTION

It is therefore an object of the invention to provide for a graphical user interface used in a data processing system.

It is another object of the invention to provide a graphical user interface for marking and subsequently retrieving a collection of objects within a compound document.

It is another object of the invention to provide a graphical user interface for maintaining a consistent collection of objects within a compound document.

The above and other objects are achieved as is now described. A method and system for marking and subsequently retrieving a collection of objects contained within a compound document. The compound document is displayed within a graphical user interface within a data processing system. The graphical user interface includes a scroll bar. A collection of objects within a portion of the compound document may be selected by a user. Thereafter, a horizontal line is displayed within the scroll bar which corresponds to the relative location of the collection of objects within the compound document. Next, in response to a user input, a dialog box is displayed at a location adjacent the horizontal line. The graphical user interface next prompts a user to enter within the dialog box a label and attributes of the collection of objects. Thereafter, In response to a selection of the horizontal line, the dialog box, including the label and the attributes, is displayed; and in response to a subsequent user input, the compound document is automatically scrolled to a location which corresponds to the location of the collection of objects within the compound document.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
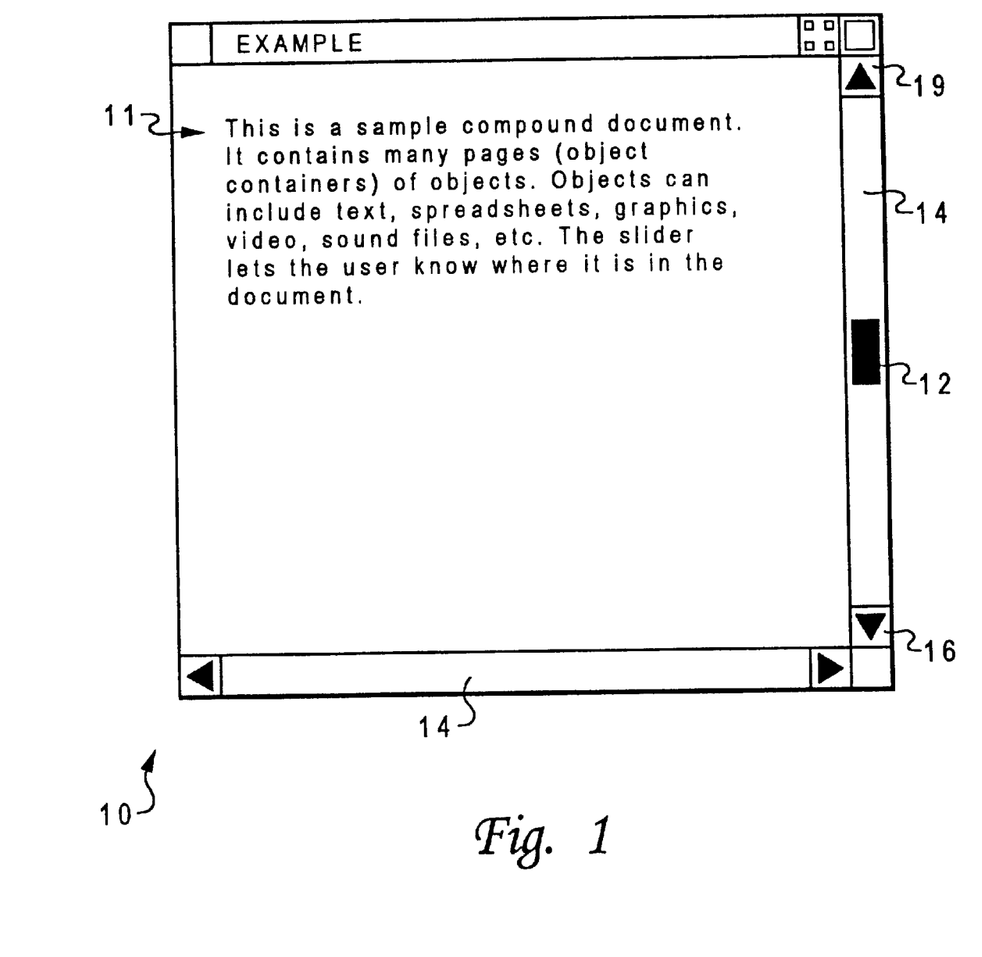
FIG. 1 is an illustration of a sample compound document enclosed within a window having a scroll bar and elevator which may be utilized in accordance with the method and system of the present invention.

With reference now to the figures and in particular with reference to FIG. 1, there is depicted a pictorial view of a window 10 that is controlled by a conventional graphical user interface which may be utilized to implement the method and system of the present invention. Window 10 displays a portion of a compound document 11 which contains multiple objects capable of running within the document, such as spreadsheets, text, sound files, graphics, video objects, etc. The size and position of elevator 12 within scroll bar 14 corresponds to the size and position of the current viewable page in relation to compound document 11. In the example window depicted in FIG. 1, because the compound document includes too many pages to view simultaneously, the user can position a mouse cursor over arrow section 19 or arrow section 16 of scroll bar 14 and click a pointing device (e.g. a mouse) to scroll the document upward or downward, as appropriate.

Figure 2:
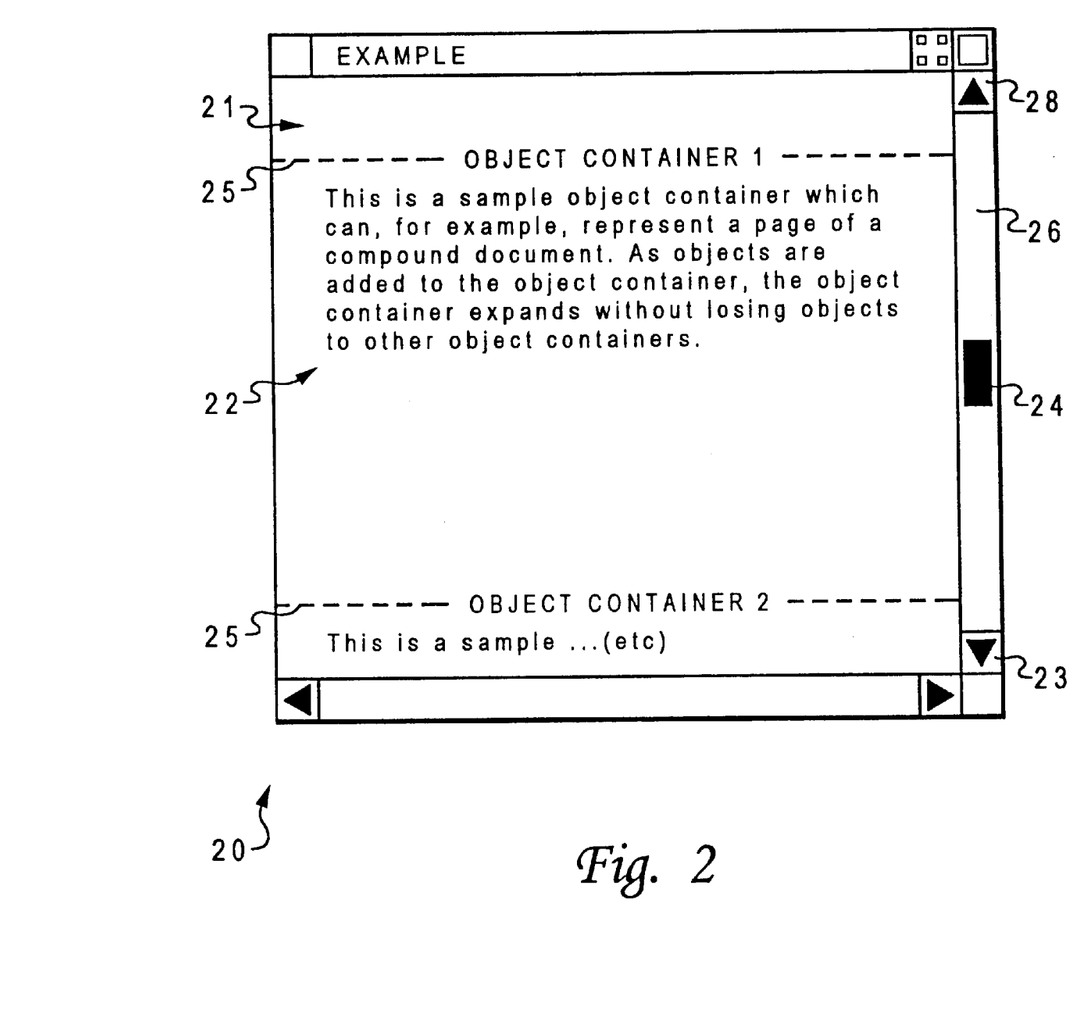
FIG. 2 depicts a graphical user interface window having a scroll bar, labels, and an object container which may be utilized in accordance with the method and system of the present invention.

FIG. 2 depicts a graphical user interface window 20 having a scroll bar, labels, and an object container which may be utilized in accordance with the method and system of the present invention. Window 20 is controlled by a conventional graphical user interface, and displays an object container 22 which maintains objects capable of running within the document such as a spreadsheets, text, sound files, graphics, video objects, etc. The size and position of elevator 24 within scroll bar 26 corresponds to the size and position of the current viewable object container in relation to the compound document. In the example of FIG. 2, because the compound document contains too many object containers to view simultaneously, the user can position a mouse cursor over arrow section 28 or arrow section 23 of scroll bar 26 and "click" a pointing device (e.g. a mouse) to scroll the document upward or downward, as appropriate. An object container border 25 separates object containers from one another.

Figure 3:
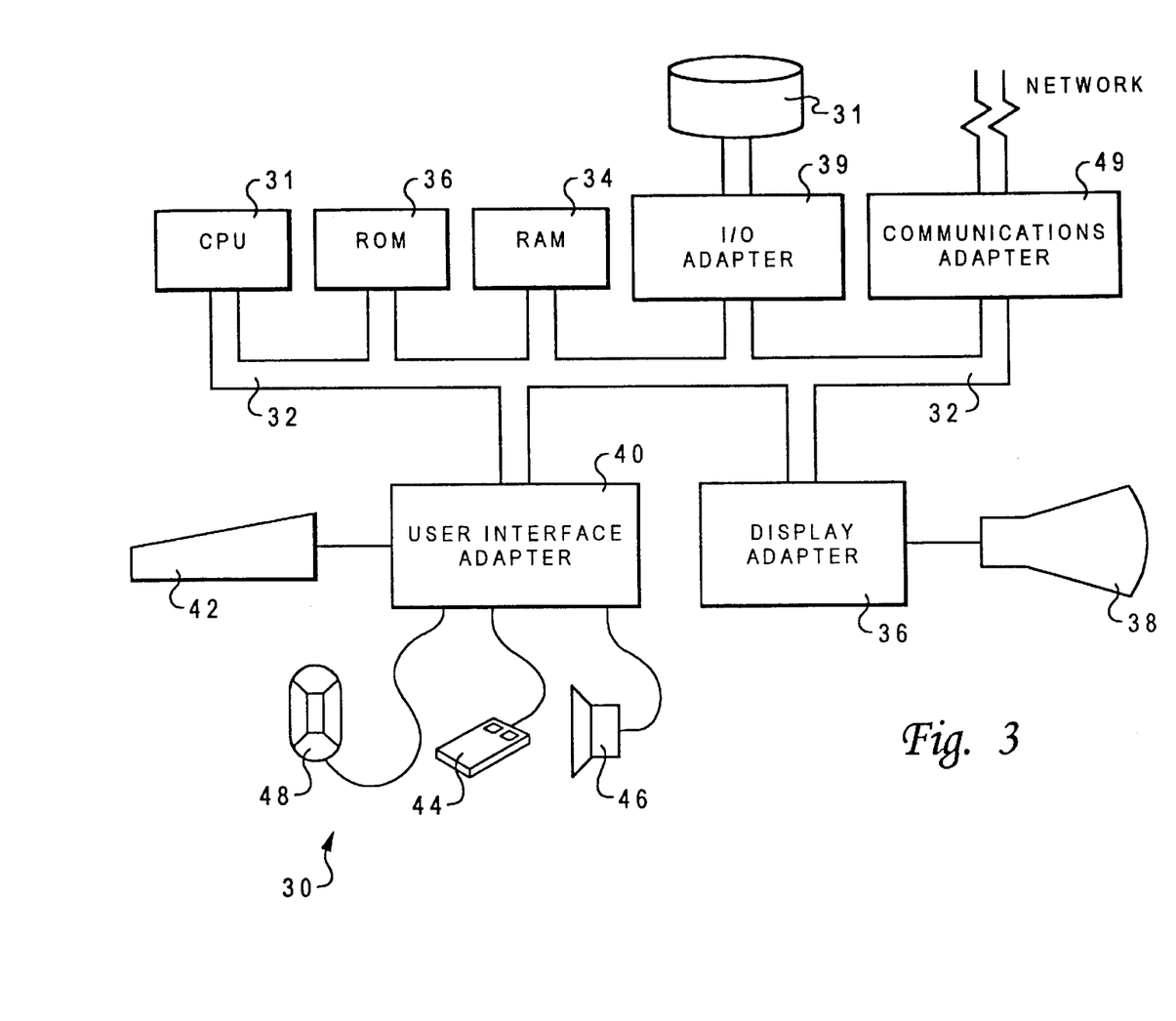
FIG. 3 is an illustration of a representative hardware environment which incorporates a graphical user interface which may be utilized in accordance with the method and system of the present invention.

FIG. 3 is an illustration of a representative hardware environment which incorporates a graphical user interface which may be utilized in accordance with the method and system of the present invention. FIG. 3 depicts a workstation 30 that includes a central processing unit ("CPU") 31, such as a conventional microprocessor, and a number of other units interconnected via system bus 32. Workstation 30 includes random access memory ("RAM") 34, read only memory ("ROM") 36, display adapter 36 for connecting system bus 32 to display device 38, and I/O adapter 39 for connecting peripheral devices (e.g. disk and tape drives 33) to system bus 32. Workstation 30 further includes user interface adapter 40 for connecting keyboard 42, mouse 44, speaker 46, microphone 48, and/or other user interface devices, such as a touch screen device (not shown), to system bus 32. Communication adapter 49 connects workstation 30 to a data processing network.

Workstation 30 also includes a graphical user interface (e.g. Motif Window Manager) that resides within a machine-readable media to direct the operation of workstation 30. Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., a graphical user interface) can direct CPU 31. Other technologies, such as touchscreen technology and human voice control, can be utilized in conjunction with CPU 31.

The graphical user interface allows a user to effectively and efficiently maintain a uniform object container within a compound document by directing CPU 31 to expand a object container as new objects are added to the object container. The graphical user interface also directs CPU 31 to contract the object container as objects are deleted or moved out of the object container. In this respect, the object container expands or contracts analogous to an accordion, while maintaining uniformity in the compound document. As the object container expands or contracts, objects within the object container will remain inside that particular object container, without being forced into another object container.

The graphical user interface sizes elevator 24 within scroll bar 26 according to the number of pages in the compound document. The length of elevator 24 is small with respect to the length of scroll bar 26 because it represents one of many pages of the compound document. Similarly, the graphical user interface positions elevator 24 within scroll bar 26 relative to the viewable position of the compound document. For example, the graphical user interface positions elevator 24 at the top of scroll bar 26 when the user is viewing the first page of the compound document, and at the bottom of scroll bar 26 when the user is viewing the last page of the compound document.

In addition to allowing an object container to dynamically expand or contract while maintaining compound document uniformity, the graphical user interface utilized in accordance with the method and system of the present invention allows a user to mark, label and subsequently retrieve specific object containers within a compound document by directing CPU 31 to create page marker gradations (hereinafter referred to by the acronym "PMG"). The user selects an object container within a compound document displayed within a graphical user interface environment by positioning the mouse cursor over a label or horizontal line associated with the relative location of the object container to be selected, and subsequently clicks the first mouse button to invoke the graphical user interface to automatically scroll to the relative location of the object container within the compound document. The PMGs allow a user to keep track of specific object containers within a compound document without have to spend time scrolling through the compound document each time the user desires to retrieve an object container. By initially marking and labeling such object containers, the object containers can be recalled at a later time.

Figure 4A:
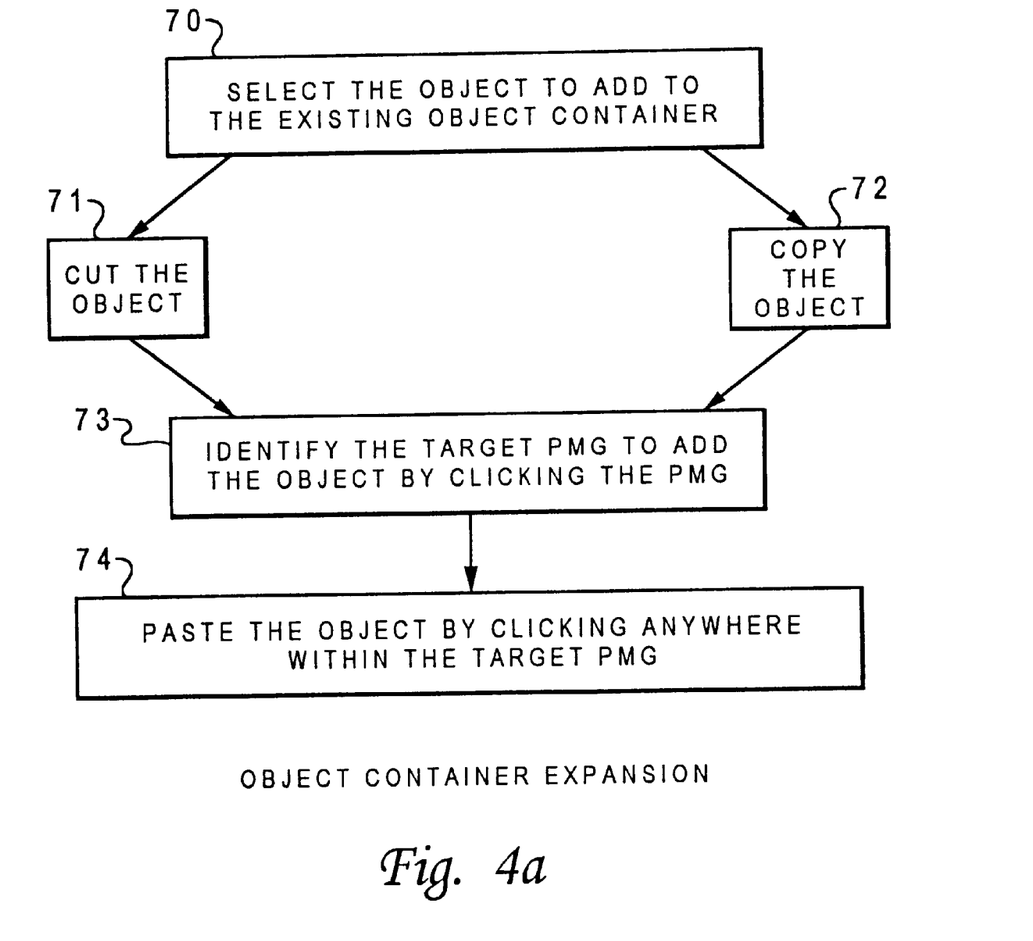
FIG. 4(a) depicts a logic flow chart illustrative of an object container expansion operation which may be utilized in accordance with the method and system of the present invention.
Figure 4B:
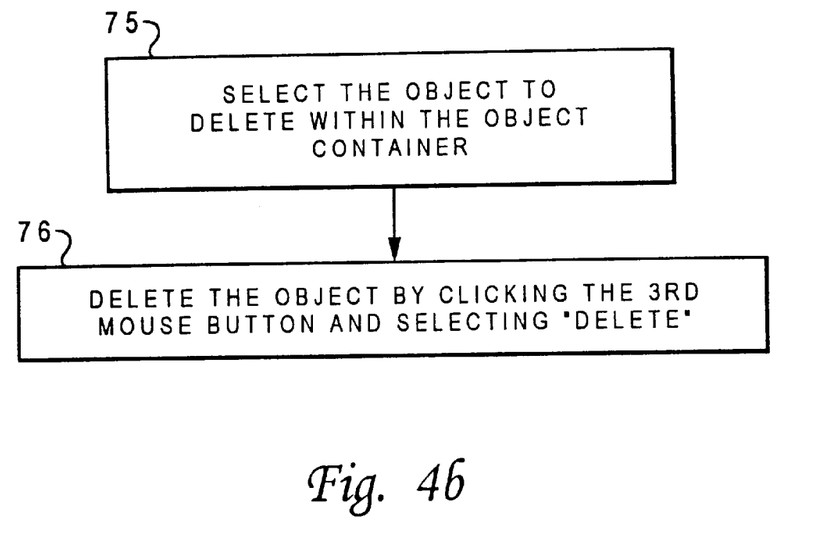
FIG. 4(b) illustrates a logic flow chart illustrative of an object container contraction operation with may be utilized in accordance with the method and system of the present invention.

There are two principle ways in which an object container can change size within in a compound document. First, the object container can expand, by the addition of an object to the object container; or second, an object container can contract, by the deletion of an object from the object container. FIG. 4(a) depicts a logic flow chart illustrative of an object container expansion operation which may be utilized in accordance with the method and system of the present invention. As depicted at block 70, a user selects the object to add to the existing object container and either cuts the object, as illustrated at block 71, or copies the object as illustrated at block 72. As depicted at block 73, the user "clicks" with a pointer (e.g. a mouse) a target PMG to add the object to the object container. As illustrated at block 74, the object can be pasted to the object container by "clicking" the pointer (e.g. a mouse) anywhere within the target PMG. The resulting object container is expanded, while maintaining its original borders. FIG. 4(b) illustrates a logic flow chart illustrative of an object container contraction operation with may be utilized in accordance with the method and system of the present invention. As depicted at block 75, the user selects the object container to delete within a particular object container. As illustrated at block 76, the object is deleted by clicking the 3rd mouse button and selecting "delete" from a graphical user interface window menu.

Figure 5:
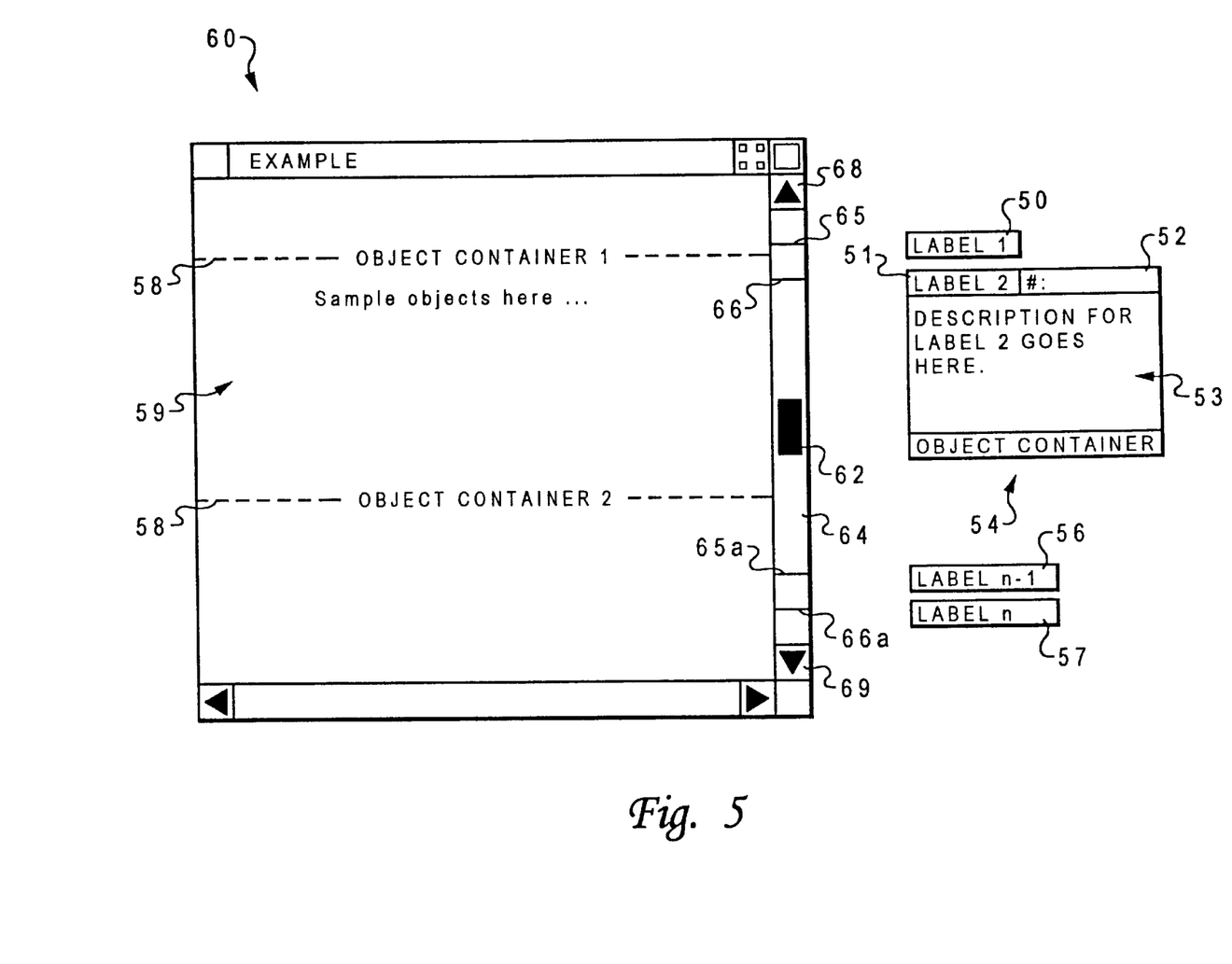
FIG. 5 depicts a graphical user interface window which displays an object container within a compound document which may be utilized in accordance with the method and system of the present invention.

FIG. 5 depicts a graphical user interface window which displays an object container within a compound document which may be utilized in accordance with the method and system of the present invention. FIG. 5 illustrates an enlarged view of a window 60 that displays attributes associated with a PMG. A PMG is depicted at 66 and 65 within scroll bar 64. PMGs are also depicted at 65a and 66a. The PMGs are horizontal lines displayed within scroll bar 64. A dialog box 54 is positioned adjacent window 60. A dialog box, in a graphical user interface, is a special window displayed by the system or application to solicit a response from the user. For example, when a user desires to print a document, the data processing system via a graphical user interface typically displays a dialog box containing controls which represent various options: draft printing vs. high resolution, landscape vs. portrait mode, and so on. Dialog box 54 can be referred to as a "PMG Attributes Window" (i.e. a window which displays attributes associated with a particular PMG). In the case of dialog box 54, attributes associated with PMG 66 are displayed within dialog box 54.

An object container border 58 separates an object container 59 from other object containers. Arrow section 68 and arrow section 69 allow a user to scroll upward or downward. A first label 50 is positioned adjacent PMG 65. A second label 51 is positioned adjacent PMG 66. Second label 51 is included within dialog box 54. Dialog box 54 includes representations for attributes associated with the PMG. Dialog box 54 includes second label 51, a one or two word description of the object container, the page number 52 containing the object container, and an optional long description 53, which is one to several sentences in length and describes the object container in greater detail. Elevator 62 allows a user to scroll quickly through a given compound document. Additional labels 56 and 57 are located alongside PMGs 65a and 66a, respectively. If a user desires to retrieve a document that has been previously "marked", the user places the cursor over a particular PMG (i.e. the horizontal line within the scroll bar) and a dialog box will appear next to the PMG, revealing attributes (i.e. label, description, page number, etc.) about the object container associated with that particular PMG. Utilizing a pointer (e.g. a mouse), the user can "click" the PMG or the label to invoke the graphical user interface to automatically scroll to the relative location of the desired object container within the compound document.

Figure 6:
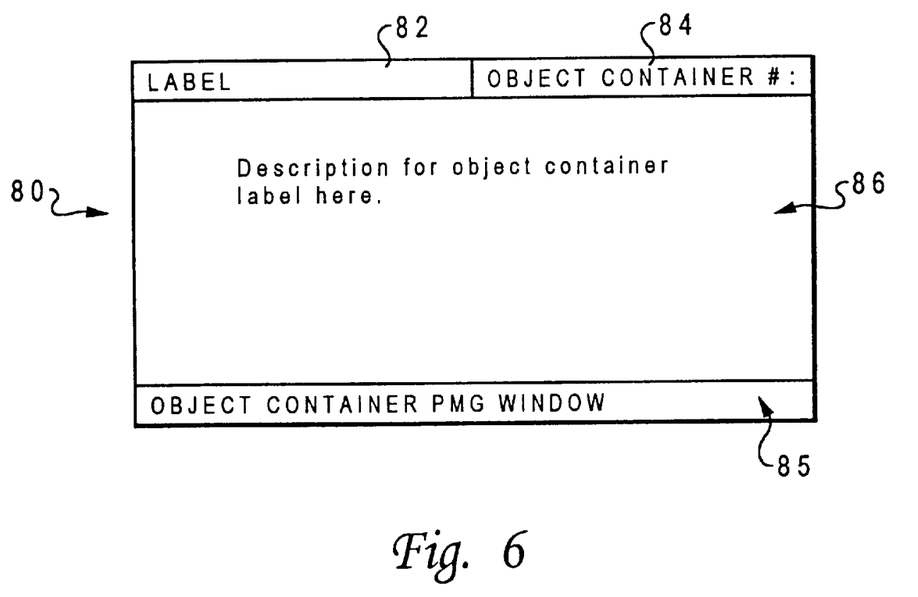
FIG. 6 is a detailed illustration of a graphical user interface window having informational and editing attributes which may be utilized in accordance with the method and system of the present invention.

FIG. 6 is a detailed illustration of a graphical user interface window 80 (i.e. a "PMG Attributes Window") having informational and editing attributes which may be utilized in accordance with the method and system of the present invention. A label describing the object container can be entered in region 82 of window 80 by the user. An "object container number" is entered in region 84 of window 80. The "object container number" is the "page number" of the beginning of the object container. A detailed description of the object container can be entered by the user in region 85 of window 80. Window 80 is analogous to dialog box 54 of FIG. 5.

Figure 7:
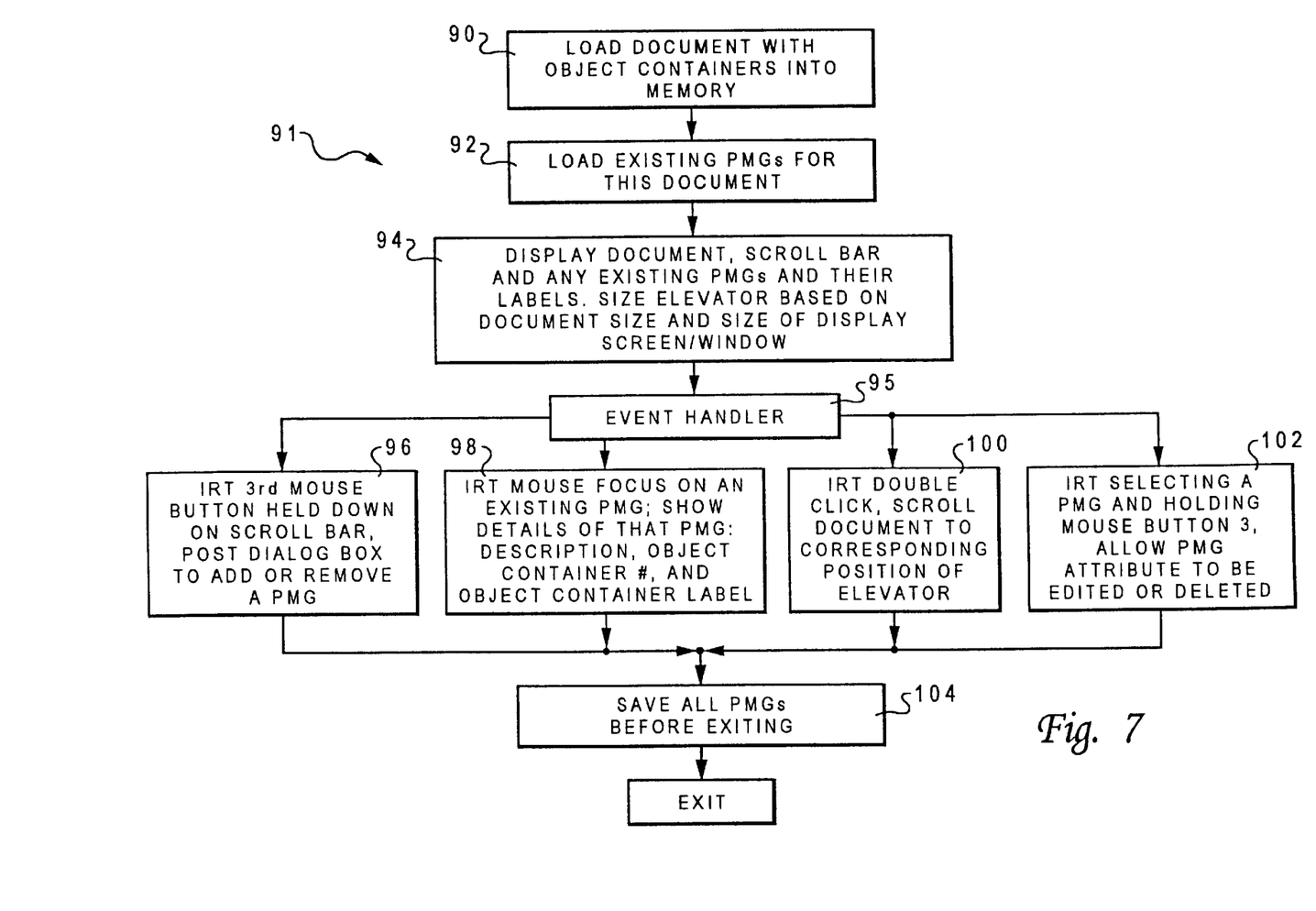
FIG. 7 depicts a detailed logic flow chart illustrative of a method for marking and subsequently retrieving an object container within a compound document which may be utilized in accordance with the method and system of the present invention.

FIG. 7 depicts a detailed logic flow chart illustrative of a method for marking and subsequently retrieving an object container within a compound document which may be utilized in accordance with the method and system of the present invention. As depicted at block 90, in response to a user opening a compound document, the graphical user interface loads every object container of the compound document from, for example, a hard disk drive, into RAM 34. Once in RAM, as illustrated at block 92, the graphical user interface loads any existing PMGs for this document. The set of PMGs for this particular document can be saved and loaded.

As depicted at block 94, the graphical user interface displays the compound document and its object containers, scroll bars, and any existing PMGs and their labels. The graphical user interface sizes elevator 62 of FIG. 5 in accordance with the size of the compound document. The PMGs are located within scroll bar 64 in proportion to the corresponding object container number and the total size of the document. For instance, a PMG that is associated with "Object Container A" at page 25 in a compound document having 100 pages would be positioned 25% from the top of scroll bar 64 of FIG. 5.

As illustrated at block 95, the event handler is entered waiting to process mouse clicks. To create a new PMG, the user selects a series of objects within the current page by pointing the mouse at the object and then clicking the left mouse button for each object within the series of objects to be selected. Then, as depicted at block 96, in response to the user pressing the third mouse button while the mouse cursor is positioned anywhere over scroll bar 64 of FIG. 5, a dialog box is posted to add a new PMG.

The user then enters a label in the dialog box in which to identify the new PMG associated with the object container. This label is visible at all times. Once the PMG is created, a horizontal line is drawn within scroll bar 64 of FIG. 5 based on the object container number (e.g "page" number) associated with the PMG. The horizontal line is proportionally located with respect to the total size of the document. "Those skilled in the art will appreciate that the fact that the horizontal line is located within the scroll bar with respect to the total size of the document also indicates that the horizontal line can be displayed within the scroll bar at a location which corresponds to the relative location of the object container within the compound document and a computed central location of the object container itself." The object container number is not entered by the user, since it is already known based on the location of the selected object container. This horizontal line is automatically initially associated with the current document location when created.

As illustrated at block 100, when the mouse is pointed to either object container description 53, horizontal gradation 66, or label 51 of FIG. 5, and double clicked, the document is automatically scrolled to the object container that corresponds to the PMG. In this manner a previously marked object container can be retrieved.

As depicted at block 102, a particular label 51 of FIG. 5 is selected by a single click of the mouse button. The label will appear highlighted. When the right mouse button is pressed and held down, a dialog appears allowing the user to either edit the editable attributes (Label, Long Description, and the Object Container) for this PMG or delete the PMG. Note that the page number is not editable, since the system maintains the association of the object container and its page number due to the dynamic nature of this relationship, i.e. the object container can be moved to a different section of the compound document entirely.

As depicted at block 98, when the mouse is pointed at label 51, "PMG Attributes Window", 80 of FIG. 6 is displayed. Note that PMG Attributes Window 80 of FIG. 6 and dialog box 54 of FIG. 5 are identical. This window displays the current values for the PMG attributes. Finally, as illustrated at block 104, all PMGs are automatically saved when the document is saved before exiting.

While the invention has been shown and described with reference to particular embodiments thereof, it will be understood by those skilled in the art that the foregoing and other changes in form and detail may be made therein without departing from the spirit and scope of the invention, which is defined only by the following claims. For example, instead of using a mouse or mouse events to create or delete objects or object containers, keyboard key sequences may be utilized which have analogous functional results.

What is claimed is:

1. A method in a data processing system for marking and subsequently retrieving a plurality of objects contained within a multipage compound document wherein said compound document is displayed within a graphical user interface within said data processing system, said graphical user interface including a scroll bar, comprising the steps of:

selecting a plurality of objects located within a portion of said compound document;

displaying a horizontal line within a scroll bar wherein said horizontal line corresponds to the relative location of said plurality of objects within said multipage compound document;

displaying, in response to a user input, a dialog box at a location adjacent said horizontal line;

prompting a user to enter a label and a description of said plurality of objects within said dialog box;

automatically calculating a page number of said plurality of objects within said multipage compound document and entering said page number within said dialog box; and thereafter displaying, in response to a selection of said horizontal line, said dialog box including said label, said description and said page number; and automatically scrolling, in response to a subsequent user input, to a location which corresponds to the location of said plurality of objects within said compound document.

2. The method of claim 1 further comprising the steps of:

storing said label, said description and said page number within a memory of said data processing system; and editing said label, said description and said page number in response to a user input.

3. The method of claim 1 further comprising the step of storing said label, said description and said page number within a memory of said data processing system when said compound document is stored within said memory.

4. The method of claim 1 further comprising the step of deleting said label, said description and said page number in response to user input.

5. The method of claim 1 further comprising the step of automatically retrieving said plurality of objects in response to user input.

6. A data processing system for permitting a user to mark and subsequently retrieve a plurality of objects contained within a multipage compound document wherein said compound document is displayed within a graphical user interface within said data processing system, said graphical user interface including a scroll bar, comprising:

selection means for selecting a plurality of objects located within a portion of said compound document;

display means for displaying a horizontal line within a scroll bar wherein said horizontal line corresponds to the location of said plurality of objects within said multipage compound document;

display means for displaying, in response to a user input, a dialog box at a location adjacent said horizontal line;

means for prompting a user to enter a label and a description of said plurality of objects within said dialog box;

means for automatically calculating a page number of said plurality of objects within said multipage compound document and entering said page number within said dialog box; and thereafter means for displaying, in response to a selection of said horizontal line, said dialog box including said label said description and said page number; and scroll means for automatically scrolling, in response to a subsequent user input, to a location which corresponds to the location of said plurality of objects within said compound document.

7. The data processing system of claim 6 further comprising means for storing said label, said description and said page number within a memory of said data processing system.

8. The data processing system of claim 7 further comprising means for editing said label, said description and said page number in response to a user input.

9. The data processing system of claim 6 further comprising means for storing said label, said description and said page number within a memory of said data processing system when said compound document is stored within said memory.

10. The data processing system of claim 9 further comprising deletion means for deleting said label, said description and said page number in response to user input.

11. The data processing system of claim 6 wherein said dialog box further comprises an attributes window having display means for displaying said label and said at least one attribute within said attributes window.

12. The data processing system of claim 6 further comprising retrieval means for automatically retrieving said plurality of objects in response to user input.

* * * * *